United States Patent
Lorca Hernando

(10) Patent No.: US 9,100,075 B2
(45) Date of Patent: Aug. 4, 2015

(54) METHOD TO IMPLEMENT A MULTIPLE INPUT MULTIPLE OUTPUT TRANSMISSION MODE

(75) Inventor: Francisco Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 14/345,117

(22) PCT Filed: Aug. 16, 2012

(86) PCT No.: PCT/EP2012/066016
§ 371 (c)(1),
(2), (4) Date: Apr. 2, 2014

(87) PCT Pub. No.: WO2013/037598
PCT Pub. Date: Mar. 21, 2013

(65) Prior Publication Data
US 2014/0348260 A1 Nov. 27, 2014

(30) Foreign Application Priority Data
Sep. 16, 2011 (ES) .................................. 201131502

(51) Int. Cl.
*H04L 27/00* (2006.01)
*H04B 7/06* (2006.01)
*H04B 7/08* (2006.01)
*H04B 7/04* (2006.01)
*H04L 1/06* (2006.01)

(52) U.S. Cl.
CPC .............. *H04B 7/063* (2013.01); *H04B 7/0413* (2013.01); *H04B 7/0617* (2013.01); *H04B 7/0686* (2013.01); *H04B 7/0697* (2013.01); *H04B 7/0868* (2013.01); *H04B 7/0669* (2013.01); *H04L 1/0618* (2013.01)

(58) Field of Classification Search
CPC ... H04B 7/0413; H04L 1/0618; H04L 7/0669
USPC .......................................................... 375/295
See application file for complete search history.

(56) References Cited

U.S. PATENT DOCUMENTS 6,208,842 B1 * 3/2001 Henderson et al. ......... 455/67.11
2007/0253501 A1 * 11/2007 Yamaura ....................... 375/262
(Continued)

FOREIGN PATENT DOCUMENTS

EP 1 860 792 A1 11/2007

OTHER PUBLICATIONS

International Search Report for PCT/EP2012/066016 dated Oct. 26, 2012.

*Primary Examiner* — Santiago Garcia
(74) *Attorney, Agent, or Firm* — Sughrue Mion, PLLC

(57) ABSTRACT

A method to implement a Multiple Input Multiple Output transmission mode In the method of the invention, said MIMO transmission mode comprises using a certain number of antennas in a user equipment and a given number of antennas in a radio access node for the communication between said user equipment and said radio access node, said communication carried out by means of a communication channel, said communication channel represented by a channel matrix. The method of the invention is characterized in that it comprises uncorrelating at least part of the coefficients of said channel matrix when said communication channel is degenerate by making use of at least one additional antenna in each of said radio access node and said user equipment in order to change the radiation pattern associated to transmission layers of said communication enabling the use of an enhanced MIMO transmission mode.

13 Claims, 18 Drawing Sheets

(56) References Cited

U.S. PATENT DOCUMENTS

| | | | |
|---|---|---|---|
| 2008/0108314 A1* | 5/2008 | Mihota | 455/101 |
| 2008/0232491 A1* | 9/2008 | Waters et al. | 375/260 |
| 2009/0268835 A1* | 10/2009 | Imai et al. | 375/267 |
| 2011/0019775 A1* | 1/2011 | Ruscitto et al. | 375/340 |
| 2011/0215968 A1* | 9/2011 | Le Comte et al. | 342/406 |
| 2011/0222616 A1 | 9/2011 | Jiang et al. | |
| 2011/0268203 A1* | 11/2011 | Chockalingam et al. | 375/260 |
| 2012/0280861 A1* | 11/2012 | Kishimoto et al. | 342/368 |

\* cited by examiner

Typical sector antenna radiation pattern

Global pattern, array TX1-TX3, d=0.50

METHOD TO IMPLEMENT A MULTIPLE INPUT MULTIPLE OUTPUT TRANSMISSION MODE

CROSS REFERENCE TO RELATED APPLICATIONS

This application is a National Stage of International Application No. PCT/EP2012/066016 filed Aug. 16, 2012, claiming priority based on Spanish Patent Application No. P201131502 filed Sep. 16, 2011, the contents of all of which are incorporated herein by reference in their entirety.

FIELD OF THE ART

The present invention generally relates to a method to implement a Multiple Input Multiple Output transmission mode, said MIMO transmission mode comprising using a certain number of antennas in a user equipment and a given number of antennas in a radio access node for the communication between said user equipment and said radio access node, said communication carried out by means of a communication channel, said communication channel represented by a channel matrix and more particularly to a method that comprises uncorrelating at least part of the coefficients of said channel matrix when said communication channel is degenerate by making use of at least one additional antenna in each of said radio access node and said user equipment in order to change the radiation pattern associated to transmission layers of said communication enabling the use of an enhanced MIMO transmission mode.

PRIOR STATE OF THE ART

Long-Term Evolution (LTE) is the next step in cellular 3G systems, which represents basically an evolution of the actual mobile communications standards, such as UMTS and GSM [2]. It is a 3GPP standard that provides throughputs up to 50 Mbps in uplink and up to 100 Mbps in downlink. It uses scalable bandwidth from 1.25 to 20 MHz in order to suit the needs of network operators that have different bandwidth allocations. LTE is also expected to improve spectral efficiency in networks, allowing carriers to provide more data and voice services over a given bandwidth.

LTE-Advanced (LTE-A), an evolution of LTE, is being standardized in LTE Release 10 and beyond. It is aimed at fulfilling IMT-Advanced requirements, whose capabilities go beyond those of IMT-2000 and include enhanced peak data rates to support advanced services and applications (100 Mbps for high mobility, and 1 Gbps for low mobility) [3].

The use of multiple antenna technology allows the exploitation of the spatial domain as another new dimension. This becomes essential in the quest for higher spectral efficiencies. Multiple antennas can be used in a variety of ways, mainly based on three fundamental principles [4]:

Diversity gain. Use of the space-diversity provided by the multiple antennas to improve the robustness of the transmission against multipath fading.

Array gain. Concentration of energy in one or more given directions via precoding or beamforming.

Spatial multiplexing gain. Transmission of multiple signal streams to a single user on multiple spatial layers created by combinations of the available antennas.

Spatial multiplexing is the only scheme that achieves an increase in the capacity of the available resources (time, frequency), multiplying the throughput by a number which, in ideal conditions, is equal to the minimum of the number of transmit and receive antennas. This number is referred to as the channel rank, and depends strongly on radio conditions and also on the geometric arrangement of both TX and RX antennas.

The spatial multiplexing scheme is only useful when the channel is non-degenerate, that is, when the channel rank is a maximum. This happens when the components of the channel matrix are all uncorrelated. Assuming we have a SU-MIMO system with N transmit antennas and M receive antennas, the channel matrix is as follows:

$$H = \begin{pmatrix} h_{00} & \cdots & h_{0,N-1} \\ \vdots & & \vdots \\ h_{M-1,0} & \cdots & h_{M-1,N-1} \end{pmatrix},$$

where $h_{ij}$ represents the complex channel coefficient between transmit antenna j and receive antenna i, as it will be depicted in FIG. 1. If all channel components are uncorrelated, the rank of this matrix will be equal to the minimum of (N, M). However, if the propagation environment "seen" by the radiated beams is very similar, the channel becomes degenerate with a rank being lower than min(N, M). If the rank becomes one, spatial multiplexing becomes impractical and the system must fall back to a diversity scheme.

It is important to note that the degeneracy of the channel cannot be compensated by precoding, irrespective of the actual employed scheme as defined for LTE and LTE-A: codebook-based precoding schemes for closed-loop MIMO (LTE transmission mode 4), or CDD (Cyclic Delay Diversity) for open-loop MIMO (LTE transmission mode 3). This is due to the fact that both precoding and CDD may be viewed as an additional matrix multiplication operation on the channel matrix H: if X is the vector containing the complex modulated symbols of each layer, and Y the complex vector after precoding, the operation can be expressed [5]:

For TM 3 (OL-MIMO): $Y=W(i) \cdot D(i) \cdot U \cdot X$, where W(i) is a precoding matrix, D(i) a diagonal matrix containing the applied cyclic delay, and U a square matrix depending on the number of layers.

For TM 4 (CL-MIMO): $Y=W(i) \cdot X$, where W(i) is a precoding matrix.

The precoded vector passes through the channel H, and the receive vector may be expressed as $H \cdot Y$. Thus, taking into account that for any two given matrices A and B the following property applies [6]:

rank($AB$)≤min(rank($A$),rank($B$))

it is clear that if the matrix H is degenerate the precoding operation will not improve the demodulation process.

Because of this, the normal mode of operation regarding SU-MIMO in LTE-A will be shown in FIG. 2: the eNodeB receives periodic or aperiodic reports from the UEs through the uplink channels PUCCH or PUSCH (2a), including the Rank Indicator (RI) which informs the downlink channel rank as seen by the UEs. Additionally, the eNodeB estimates the uplink channel rank through e.g. uplink SRS transmissions.

Based on these channel ranks, and on the channel quality indicators (CQI), the eNodeB decides whether or not to use a spatial multiplexing scheme in both uplink and downlink directions:

If the CQI is lower than some predefined threshold (2b), the system falls back to a one-layer transmission scheme (2c).

If the CQI is greater than the aforementioned threshold, the eNodeB selects a number of layers for transmission which is always below or equal than the corresponding rank. If the rank is one (2d), the system again falls back to a one-layer transmission scheme so as to avoid the degeneracy of the channel matrix. Otherwise the system fully exploits spatial multiplexing (2e).

The degeneracy of the channel matrix is a situation that should be avoided in order to achieve the expected throughputs of LTE and LTE-A, because diversity schemes cannot exploit the spatial multiplexing advantage of having multiple antennas.

There also exist solutions to overcome this problem. As an example, in [8] it is described a system for use in MIMO vehicular systems, which has several directional sub-arrays mounted on different faces of the vehicle. As each sub-array will experience different channel conditions, based on the channel rank or other appropriate metric the system may select the sub-array with the best predicted performance. The drawback of this solution is that it is only suitable for vehicular conditions, because a large amount of space is needed to locate the different sub-arrays, making the system more complex and expensive.

Another solution is proposed in [9], in which the configuration and radiation/polarization properties of the array are adaptively modified by altering the physical structure of the antenna components. This solution involves complicated reconfigurable antenna elements (with micro-electromechanical actuators), and a processing unit to search for the optimal arrangement. Thus it may be not suitable for low-cost user equipments.

In [10] it is described another invention, in which a multibeam antenna employs two different array antennas. A maximum radiation direction of a combined beam from the second array antenna is oriented to a direction corresponding to a null point of the combined beam from the first array antenna. By doing so, the two antenna beams are quite low in correlation and may be arranged in proximate locations. The drawback of this invention is that the beams point towards fixed directions, so there is no chance to adaptively follow the channel characteristics. In addition, the two beams are achieved by using altogether a minimum of four antennas, which may increase the overall cost and complexity.

Finally, in [11] the approach is to configure an antenna array by dividing it into sub-arrays, based on the antenna correlation matrix, such that correlations among antennas within each sub-array are higher than correlations among antennas belonging to different sub-arrays. Beamforming weighs are generated for each antenna within the sub-arrays, and a MIMO mechanism is further applied among the sub-arrays. This scheme has the limitation of requiring a high number of antennas to form the sub-arrays (at least two for each transmission layer), as well as the calculation of the correlation matrix through, e.g., a calibration procedure, or through feedback signals from the mobile terminals.

DESCRIPTION OF THE INVENTION

It is necessary to offer an alternative to the state of the art which covers the gaps found therein, particularly related to the lack of proposals which allow using spatial multiplexing techniques when the communication channel is degenerate.

To that end, the present invention provides a method to implement a Multiple Input Multiple Output transmission mode, said MIMO transmission mode comprising using a certain number of antennas in a user equipment and a given number of antennas in a radio access node for the communication between said user equipment and said radio access node, said communication carried out by means of a communication channel, said communication channel represented by a channel matrix.

On contrary to the known proposals, the method of the invention, in a characteristic manner it comprises uncorrelating at least part of the coefficients of said channel matrix when said communication channel is degenerate by making use of at least one additional antenna in each of said radio access node and said user equipment in order to change the radiation pattern associated to transmission layers of said communication enabling the use of an enhanced MIMO transmission mode.

Other embodiments of the method of the first aspect of the invention are described according to appended claims 2 to 15, and in a subsequent section related to the detailed description of several embodiments.

BRIEF DESCRIPTION OF THE DRAWINGS

The previous and other advantages and features will be more fully understood from the following detailed description of embodiments, with reference to the attached drawings (some of which have already been described in the Prior State of the Art section), which must be considered in an illustrative and non-limiting manner, in which.

DETAILED DESCRIPTION OF SEVERAL EMBODIMENTS

Figure 1:
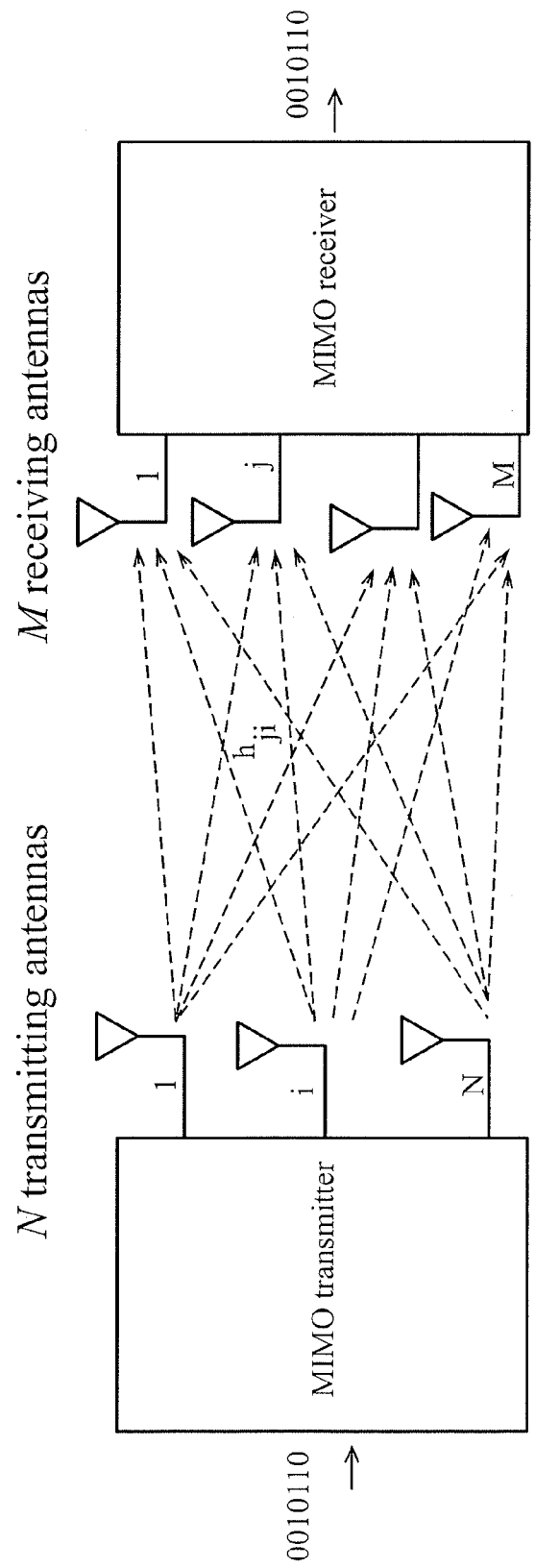
FIG. 1 shows a current SU-MIMO system, with N transmitting antennas and M receiving antennas.
Figure 2:
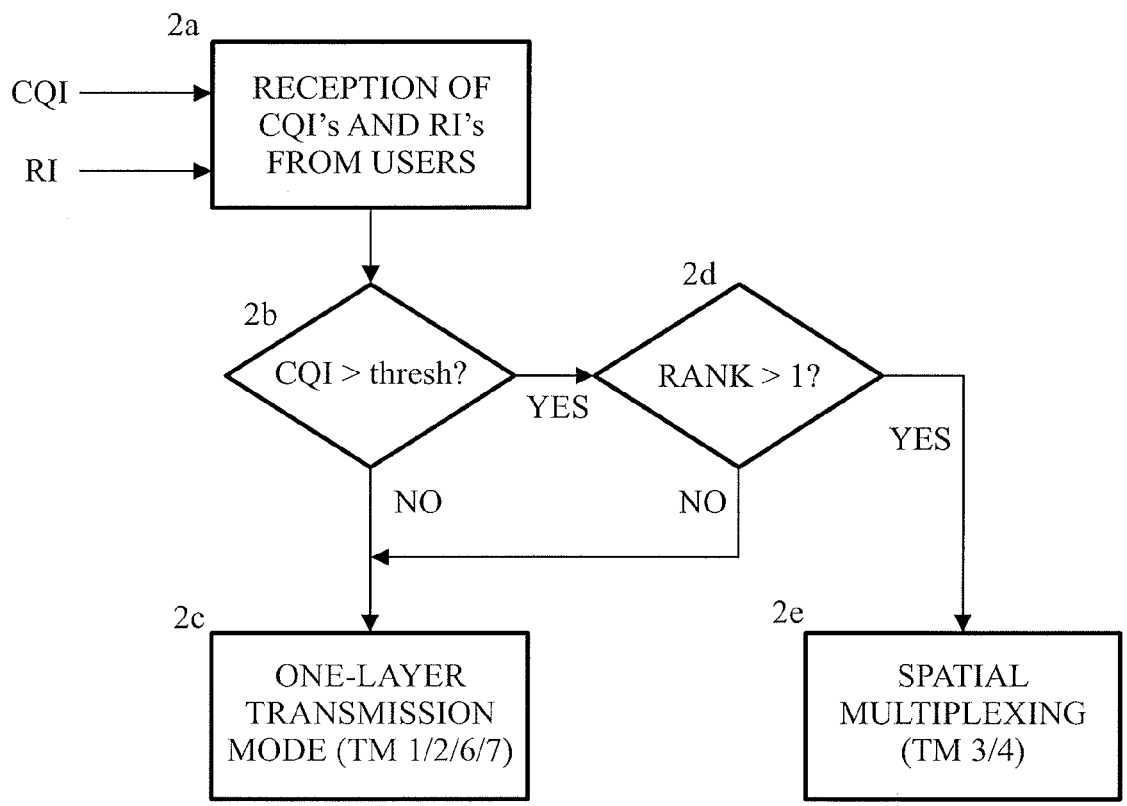
FIG. 2 shows current mode of operation of a SU-MIMO system in a LTE-A deployment.
Figure 3:
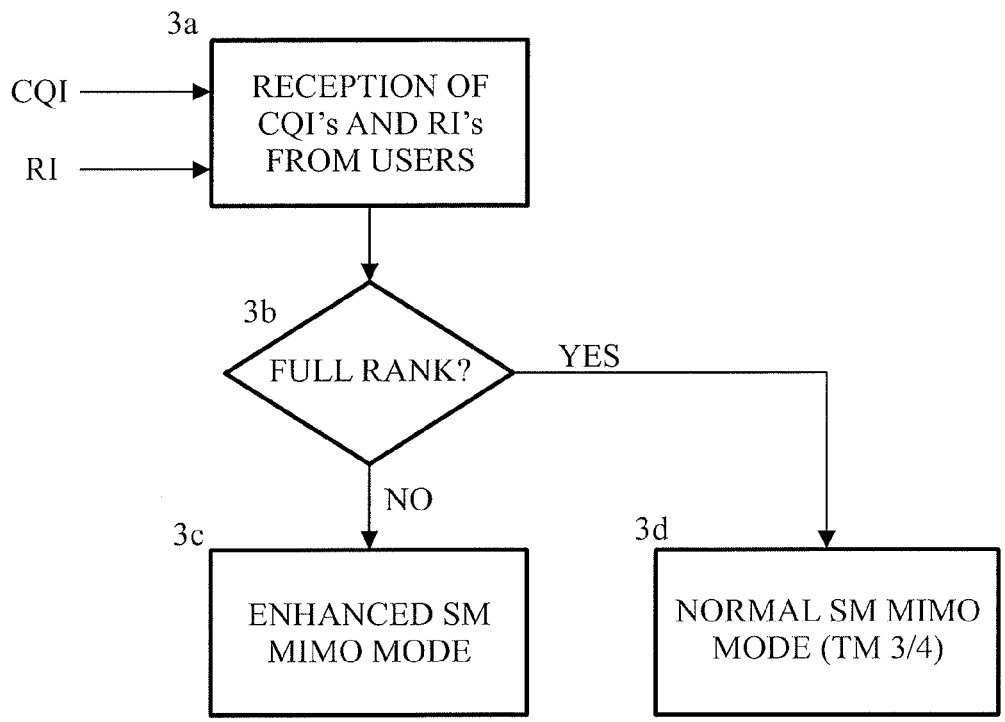
FIG. 3 shows the proposed mode of operation for a new enhanced spatial multiplexing MIMO transmission node, according to an embodiment of the present invention.

The present invention proposes to introduce a new enhanced spatial multiplexing (SM) MIMO transmission mode, which will make sense when the channel rank is lower than the minimum of the number of transmit and receive antennas (i.e. there is no full-rank transmission), as shown in FIG. 3.

Following the reception of the CQIs and RIs from the UEs (3a), the system evaluates the channel rank (3b). If the transmission is full-rank, it operates in one of the usual spatial multiplexing modes (3d), be it open-loop or closed-loop. Otherwise, the system operates in an "enhanced spatial multiplexing transmission mode" which is the object of the present invention (3c).

In order to clarify the proposed enhanced SM transmission mode, a LTE-A 2×2 SU-MIMO system will be assumed. The basic idea proposed in this invention is to make use of an additional, or several additional, antenna port(s) for both transmission and reception in order to differentiate the radiation patterns of the different transmission layers. This will hopefully enhance the channel characteristics so as to uncorrelate the matrix elements $h_{ij}$.

The new antenna ports need not be connected to any additional power amplifier (in transmission) or LNA (in reception), apart from the ones present in a typical MIMO system. Instead, they are intended to form "virtual" antenna arrays in conjunction with the other antenna elements. In transmission, each new antenna element will be fed with a linear combination of the signals that constitute the transmission layers. In reception, the RF signals coming from each antenna again are linearly combined before entering the LNA.

The linear combinations may be obtained through typical passive elements such as e.g. attenuators, dividers, circulators, etc. Hence, the total transmit (and receive) power will be the same as with a normal MIMO system.

Figure 4:
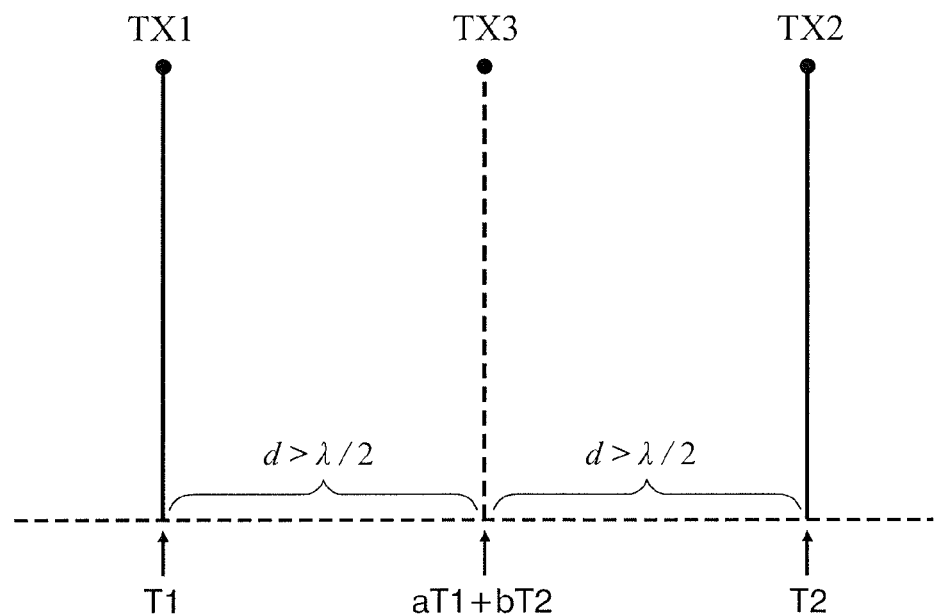
FIG. 4 shows a possible configuration for transmission considering an example of two monopole antennas, according to an embodiment of the present invention.
Figure 5:
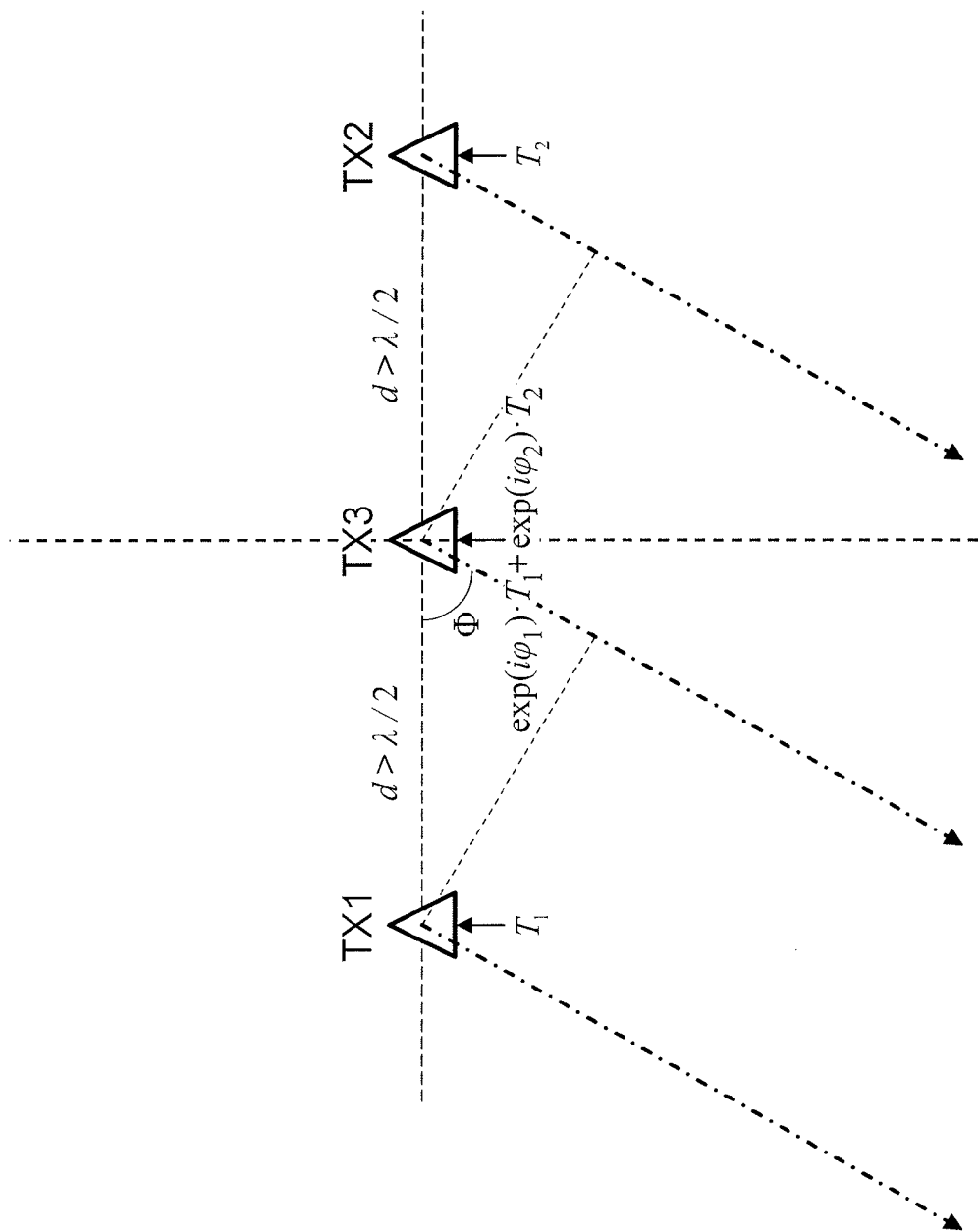
FIG. 5 shows a schematic arrangement of two monopole antennas along with an additional central antenna seen from top perspective, according to an embodiment of the present invention.

FIG. 4 sketched a possible configuration for transmission considering an example of two monopole antennas (however, the present invention does not preclude any type of antenna). In addition to antennas TX1 and TX2 (each one corresponding to one transmission layer), fed with complex signals T1 and T2 respectively, a third antenna TX3 is located between the other two, and is fed with a linear combination of the signals T1 and T2.

The third antenna serves for the purpose of creating two "virtual" antenna arrays, one for each transmission layer. First array is composed of antenna TX1 and part of the new (central) antenna, the part corresponding to the signal a·T1, a being for simplicity a unitary complex factor in the form $\exp(i\phi_1)$. The second array is composed of antenna TX2 and the part of the central antenna corresponding to the signal b·T2, with b being in the form $\exp(i\phi_2)$.

The purpose of these arrays is to change the radiation pattern associated with the two transmission layers. Suppose that, in absence of the third central antenna, the channel matrix H is singular, so its rank is equal to one. Considering first the part of the channel comprising the transmit antennas and their surroundings, the degeneracy of the channel matrix H means that the channels "seen" by the radio signals coming from the two antennas are highly correlated. This situation appears, as an example, when a significant LOS (line of sight) component is present between the transmitter and the receiver, and is particularly harmful. One means of avoiding this situation is to change the radiation pattern in such a way that the channel coefficients are different for both transmission layers.

It is possible to choose coefficients a, b in order to achieve nulls or peaks along different directions of space, thus removing the degeneracy of the channel matrix. The actual coefficients need not be known by the receiver; the transmitter may also vary their values dynamically in order to find the most suitable combination (e.g. following pre-calculated patterns that enforce nulls or peaks along predefined directions of space).

At the receive side there is an analogous situation. By adjusting different phase factors on the signals received by each antenna, the receive radiation pattern will be changed by creating new nulls and peaks that, in conjunction with the ones created at the transmit side, will hopefully enhance the channel characteristics.

In order to apply the same mechanism in both TX and RX, the eNodeB shall inform the UE of the proposed enhanced spatial multiplexing transmission mode, by means of an appropriate control message which will not be discussed here.

The proposed invention is equally valid for both open loop and closed loop spatial multiplexing modes. Henceforth, two new transmission modes may be considered: "enhanced open-loop spatial multiplexing" and "enhanced closed-loop spatial multiplexing", which would be the "enhanced" analogous of LTE-A transmission modes 3 and 4, respectively.

It is important to emphasize that no extra power amplifier is required for the central antenna TX3. Instead, only a passive combining network is needed, because the total transmit power must be the same as without the extra antenna. However, a proprietary solution may employ an additional power amplifier for this antenna in order to improve gain, noise figure, etc., but this is not required for the present invention.

The concept described in the present invention can be generalized for the case of having an arbitrary number of transmit and receive antennas. However, regarding a LTE-A system, a SU-MIMO 2×2 configuration will be considered (later on it will be generalized to N×M antennas).

Example with Linearly Co-Polarized Antennas

Figure 6:
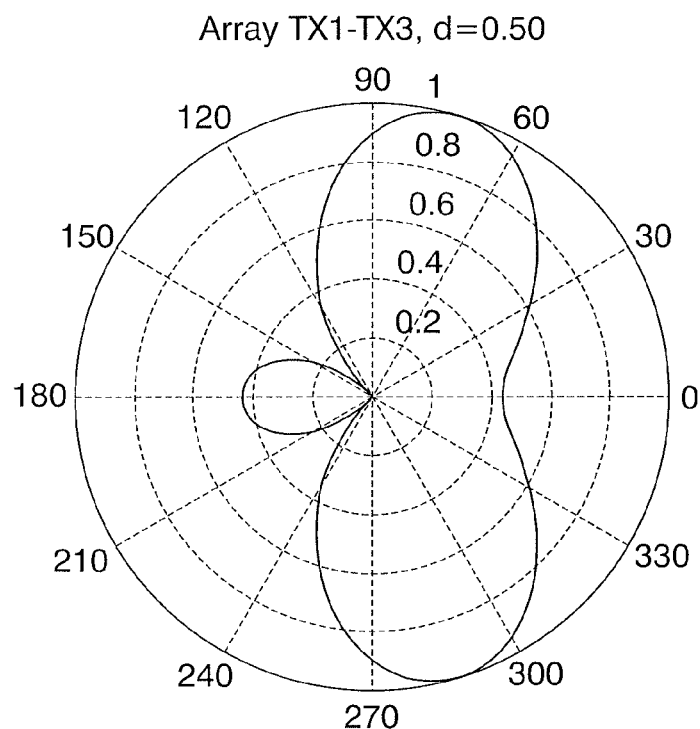
FIGS. 6 and 7 show the resulting radiation pattern of each transmission layer for the case of $d=\lambda/2$ when choosing the appropriate values for the relative phases of two monopole antennas along with an additional central antenna in order to have nulls along directions $\Phi=\pm\pi/4$, $\pm 3\pi/4$ in the azimuth plane, according to an embodiment of the present invention.

FIG. 6 showed a schematic arrangement of two monopole antennas TX1 and TX2 along with an additional central antenna TX3, as seen from a top perspective. The antenna elements TX1 and TX2 form the usual 2×2 MIMO combination (in this case being linearly co-polarized), and an additional TX3 port has been added in the middle of them.

The complex RF signals T1 and T2 feed the corresponding antenna ports TX1 and TX2, and port TX3 is fed with a linear combination:

$$T_3 = \exp(i\phi_1) \cdot T_1 + \exp(i\phi_2) \cdot T_2$$

The separation between the antenna elements is d and is supposed to be greater or equal than $\lambda/2$. This condition is usually met in the eNodeB in order to keep the antenna correlation at a minimum. Having a high separation is beneficial for the proposed invention.

The resulting combination gives rise to two "virtual" antenna arrays, one for each transmitted layer:

Array formed by the radiated signals T1+exp(iφ1) T1, coming from antenna ports TX1 and TX3.

Array formed by the radiated signals T2+exp(iφ2) T2, coming from antenna ports TX2 and TX3.

These two arrays can be analyzed with the help of the so-called array factor of the structure, which for a linear array of M elements is defined as [7]:

$$AF(\Phi) = \sum_{m=0}^{M-1} I_m \exp i(-\vec{k} \cdot \vec{r}_m + \varphi_m).$$

where:
$I_m$ are the currents of the elements of the array;

$$\vec{k} = \frac{2\pi}{\lambda}\vec{u}$$

with u being a unitary vector in the direction of propagation;
$r_m$ are the position vectors of the elements of the array;
$\phi_m$ are the relative phases of the elements of the array.
$\Phi$ is the angle measured in the azimuth plane.

The global radiation pattern is the product of the array factor and the radiation pattern of the individual antenna elements (assuming that all are identical). In the case of monopoles the radiation is omni-directional in azimuth ($\Phi$ plane), so the resulting diagram is identical to the array factor, but with other antennas this may not be the case.

In the proposed scenario, taking the origin as the centre of each of the arrays considered, the two normalized array factors become:

$$\text{For } TX1 + TX3: AF_{TX1-TX3}(\Phi) = \cos\left(\frac{kd\cos\Phi - \varphi_1}{2}\right)$$

$$\text{For } TX2 + TX3: AF_{TX2-TX3}(\Phi) = \cos\left(\frac{kd\cos\Phi + \varphi_2}{2}\right)$$

There appear multiple possibilities for the choice of the phases φ1 and φ2. The present invention is equally valid irrespective of the actual phases, which will be implementation specific.

Nulls Along Directions $\Phi = \pm\pi/4, \pm 3\pi/4$

Suppose we desire to have different radiation nulls for signals T1 and T2, specifically in the directions $\pi/4$ and $3\pi/4$, in order to favour the radio paths to be uncorrelated. Forcing e.g. array TX1-TX3 to be null at direction $3\pi/4$, and array TX2-TX3 to be null at $\pi/4$ we find the values for the phases:

$$\varphi_1 = \pi\left(-1 - \sqrt{2}\frac{d}{\lambda}\right),$$

$$\varphi_2 = \pi\left(1 - \sqrt{2}\frac{d}{\lambda}\right).$$

Figure 7:
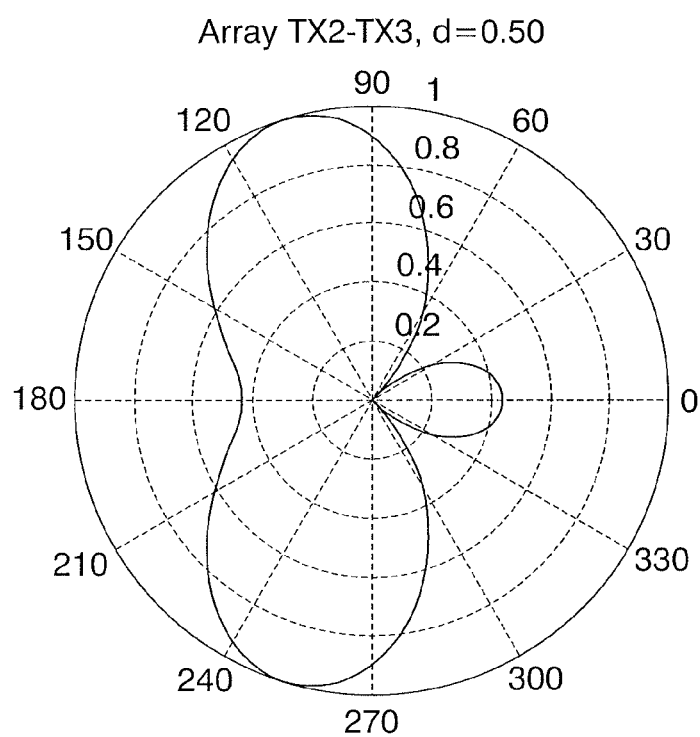

In FIGS. 6 and 7 they were sketched the resulting radiation pattern of each transmission layer for the case $d=\pi/2$. It can be seen that the radiation patterns are somewhat deviated.

It is important to note that, when the antennas are separated a distance equal or higher than half a wavelength, multiple lobes appear. This situation is to be avoided in typical arrays, where it is important to obtain low secondary lobes, but for the present invention it is beneficial: the objective is not to concentrate the energy along a certain direction, but to change the radiation pattern of each transmission layer and scatter the energy in a different way for both layers. The appearance of high secondary lobes enhances the energy dispersion and hence the correlation properties of the channel matrix.

Nulls Along Directions $\Phi=0, \pm\pi/2$

This solution is obtained by forcing array TX1-TX3 to be null along 0°, and TX2-TX3 along $\pm\pi/2$. The relative phases are:

$$\varphi_1 = \pi\left(\pm\frac{2d}{\lambda} - 1\right)$$

$$\varphi_2 = \pi$$

Figure 8:
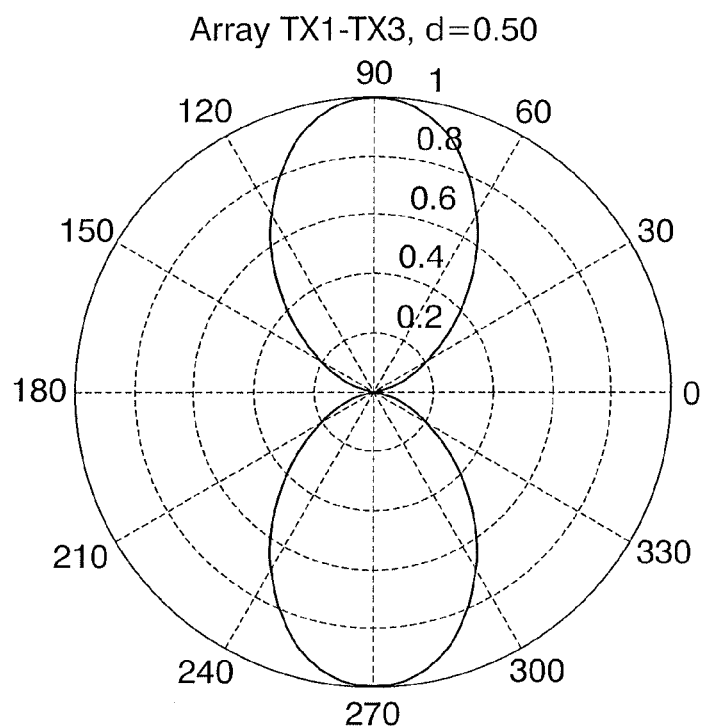
FIGS. 8 and 9 show the resulting radiation pattern of each transmission layer for the case of $d=\lambda/2$ when choosing the appropriate values for the relative phases of two monopole antennas along with an additional central antenna in order to have nulls along directions $\Phi=0$, $\pm\pi/2$ in the azimuth plane, according to an embodiment of the present invention.
Figure 9:
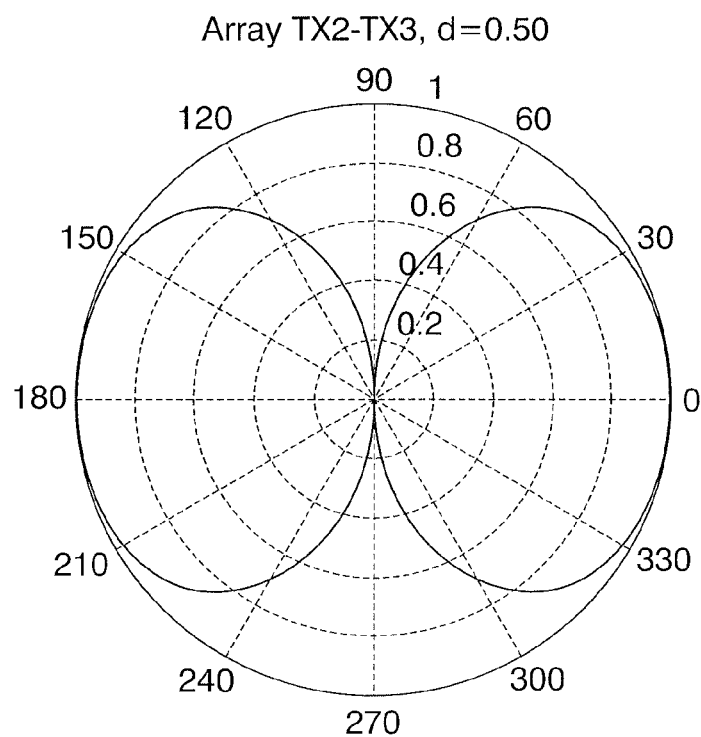

The resulting radiation patterns were shown in FIGS. 8 and 9 for $d=\pi/2$.

This example allows for a clear separation of the directions of maximum gain.

Other multiple configurations are possible by selecting different values of the relative phases, and this invention does not prefer the use of any value over another. The eNodeB will be able to change and test several values of the relative phases without informing the user terminals, thus allowing for an adaptive search of the optimum configuration for each case.

Example with Linearly Cross-Polarized Antennas

This is the case most typically found in cellular systems, because it achieves low correlation between antenna elements. The analysis is identical, except that in this case the antenna radiation pattern has the typical sector form, which influences the resulting global radiation pattern.

Figure 10:
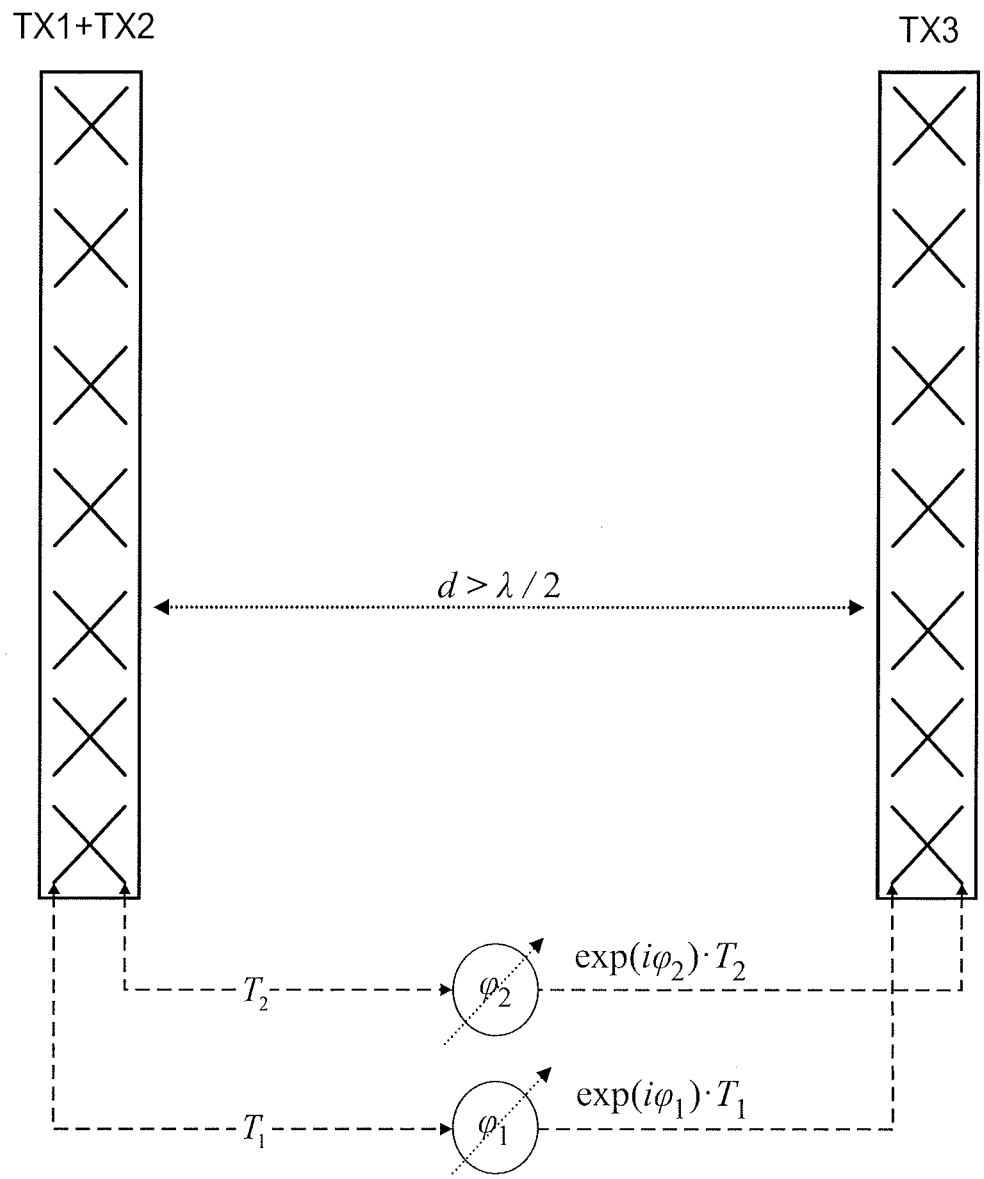
FIG. 10 shows a schematic arrangement of pairs of linearly cross-polarized antenna elements along with a panel antenna with its pairs of cross-polarized elements, according to an embodiment of the present invention.

The antenna configuration was shown in FIG. 10. Pairs of cross-polarized antenna elements are disposed forming a panel antenna, named "TX1+TX2" to maintain the same terminology as in the linear case. The additional antenna element, TX3, is really another panel antenna with its pairs of cross-polarized elements. Apart from the different geometry, the concept is analogous to the linear case; however the difference lies in that antennas TX1 and TX2 have orthogonal polarizations (which improves the correlation properties), and hence the elements in TX3 are also orthogonal.

The different radiation patterns may now be obtained without the use of any power divider, because the antenna elements are physically separated. Virtual arrays "TX1-TX3" and "TX2-TX3" are now formed by the elements in both antennas which share the same polarization, as shown in FIG. 10.

Figure 11:
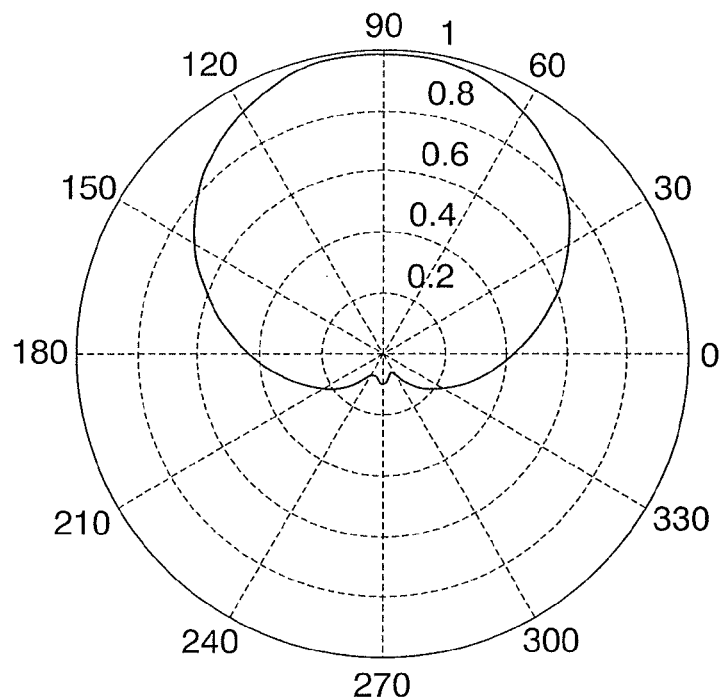
FIG. 11 shows a typical sector antenna radiation pattern.

FIG. 11 showed a typical 120°—sector antenna radiation pattern in the azimuth plane (the one of interest for the present invention).

Due to the geometric arrangement, the two virtual arrays are identical in this case and the corresponding array factors have the form:

For TX1+TX3:

$$AF_{TX1\text{-}TX3}(\Phi) = \cos\left(\frac{kd\cos\Phi - \varphi_1}{2}\right)$$

For TX2+TX3:

$$AF_{TX2\text{-}TX3}(\Phi) = \cos\left(\frac{kd\cos\Phi - \varphi_2}{2}\right)$$

The analysis is thus analogous to the monopole antenna case, simply changing the sign of $\phi_2$.

Figure 12:
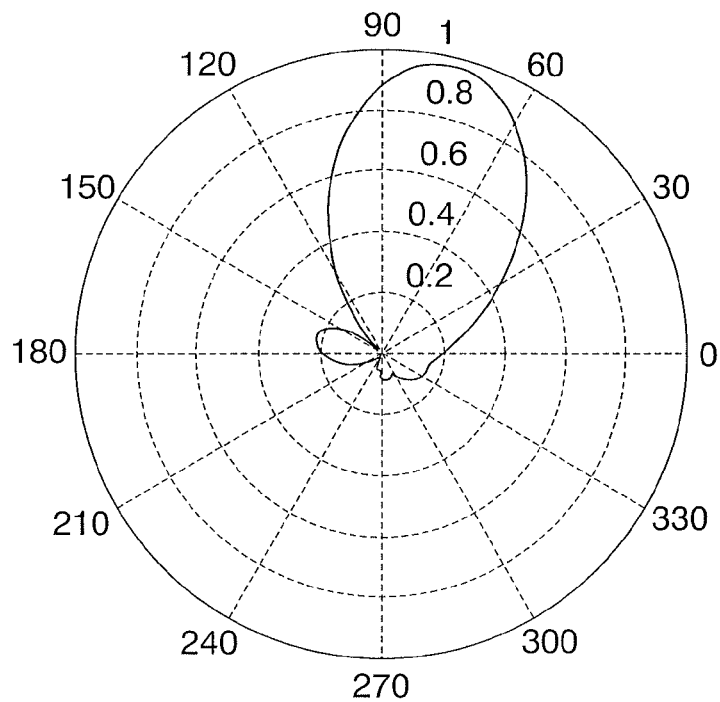
FIGS. 12 and 13 show the resulting radiation pattern of each transmission layer for the case of $d=\lambda/2$ when choosing the appropriate values for the relative phases of pairs of linearly cross-polarized antenna elements along with a panel antenna with its pairs of cross-polarized elements in order to have nulls along directions $\Phi=\pm\pi/4$, $\pm 3\pi/4$ in the azimuth plane, according to an embodiment of the present invention.
Figure 13:
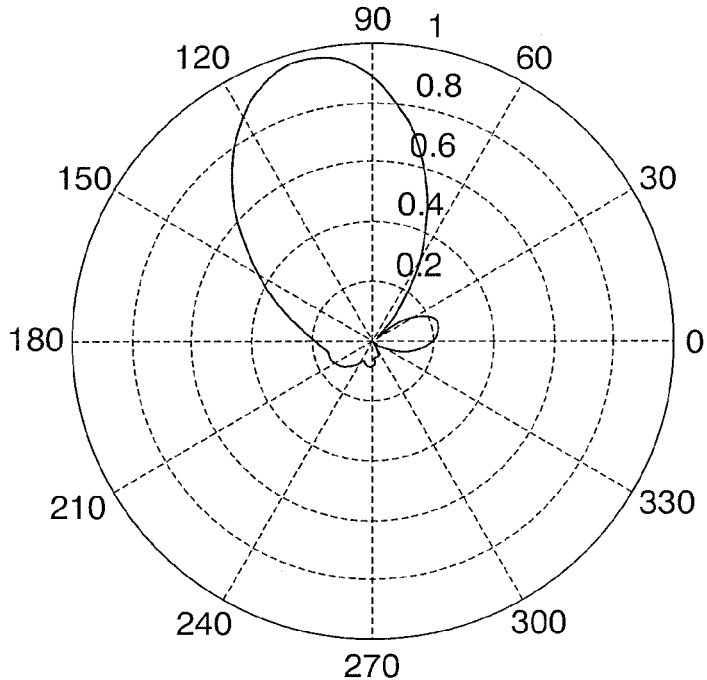
Figure 14:
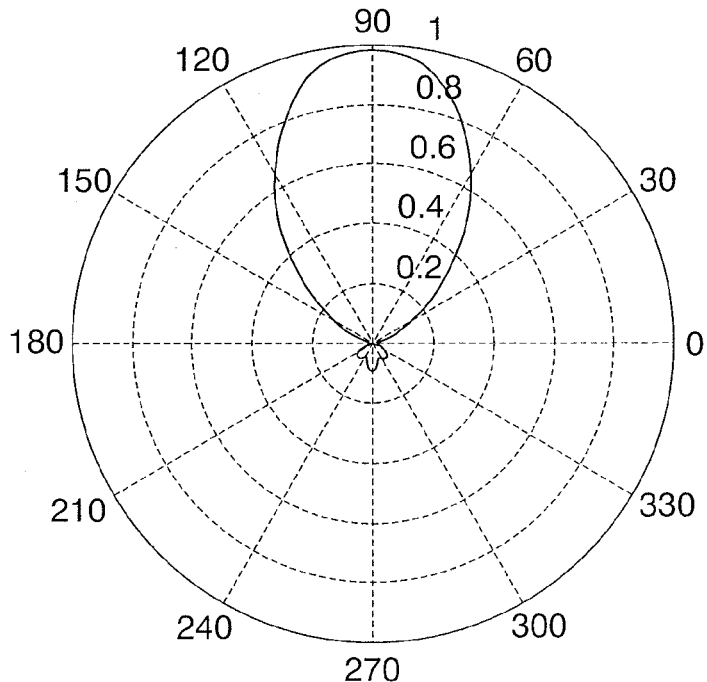
FIGS. 14 and 15 show the resulting radiation pattern of each transmission layer for the case of $d=\lambda/2$ when choosing the appropriate values for the relative phases of pairs of linearly cross-polarized antenna elements along with a panel antenna with its pairs of cross-polarized elements in order to have nulls along directions Φ=0, ±π/2 in the azimuth plane, according to an embodiment of the present invention.
Figure 15:
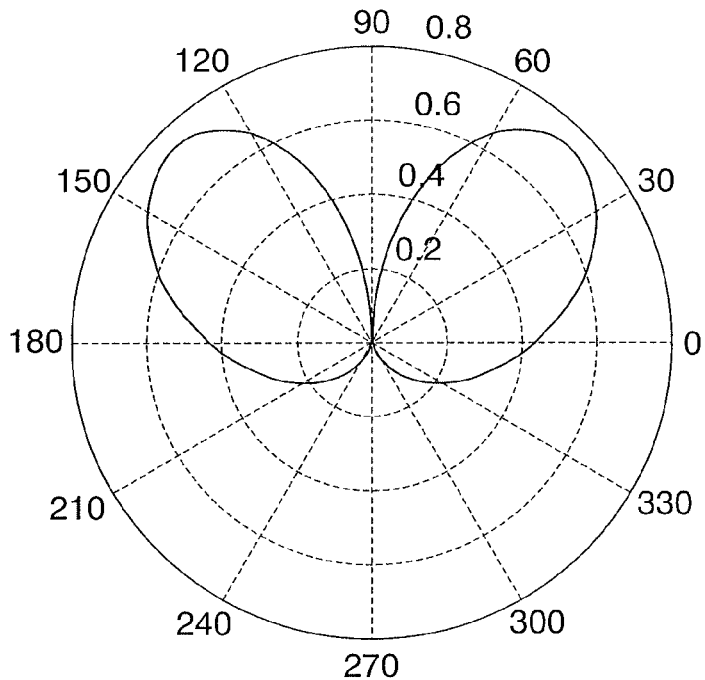

The global radiation pattern, taking into account the antenna gain, were shown in FIGS. 12 and 13 for the case of nulls along directions $\Phi=\pm\pi/4, \pm3\pi/4$ and in FIGS. 14 and 15 for the case of nulls along directions $\Phi=0, \pm\pi/2$.

It is apparent that multiple combinations are possible in order to force different propagation directions for the two transmission layers. Again any value may be used depending on the actual implementation, limitations on the hardware, granularity of the applicable phases, and so on.

Enhanced 2×2 SM Transmission Mode, UE Side

At the user terminal it is more difficult to have antenna separations of half a wavelength; hence it is worthwhile to examine the case of a lower antenna separation. The radiation pattern of each antenna is usually omni-directional in azimuth, therefore the array factor coincides with the global radiation pattern in this plane.

Figure 16:
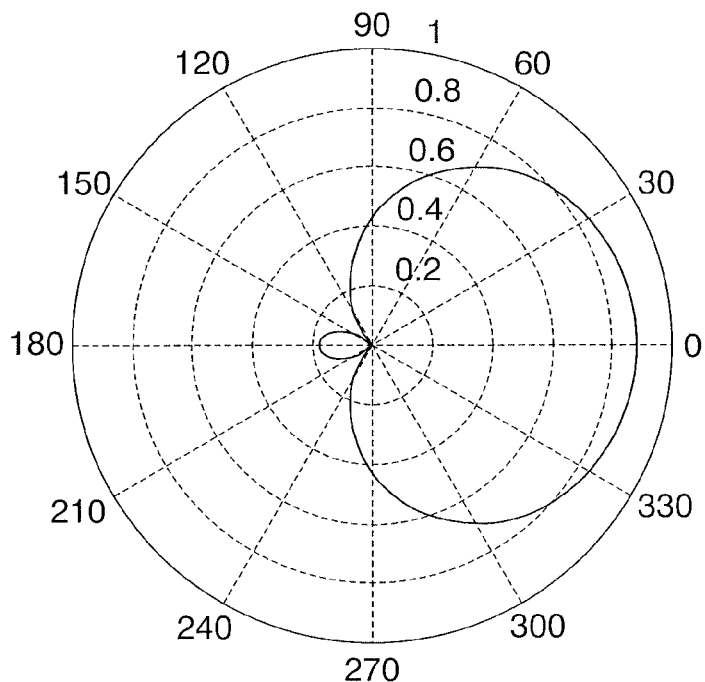
FIGS. 16 and 17 show the resulting radiation pattern of each transmission layer for the case of d<λ/2 when choosing the appropriate values for the relative phases of two monopole antennas along with an additional central antenna in order to have nulls along directions Φ=±π/4, ±3π/4 in the azimuth plane, according to an embodiment of the present invention.
Figure 17:
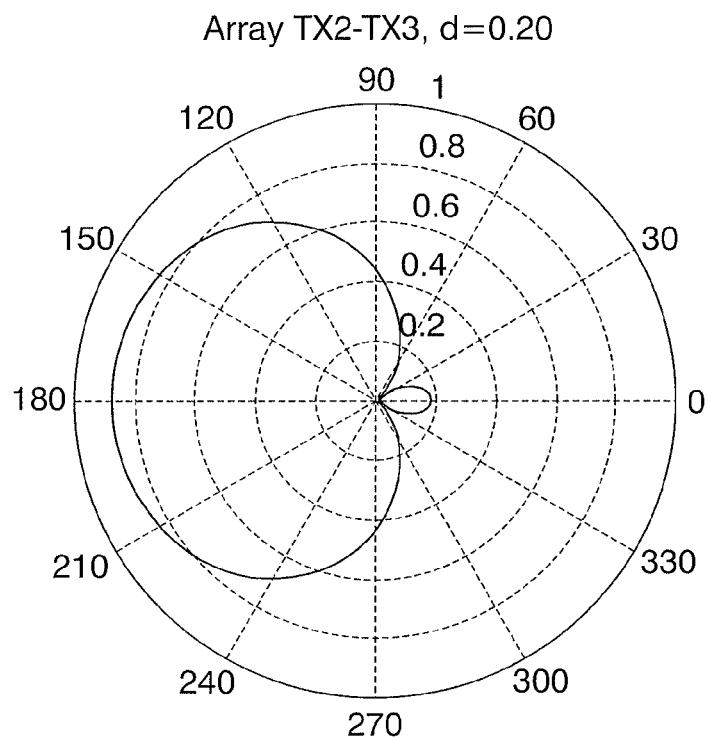

FIGS. 16 and 17 showed the corresponding diagrams obtained with a separation of 0.2λ. It is clear that no secondary maxima appear in this case, only small lobes pointing towards an opposite direction of the main lobe.

Figure 18:
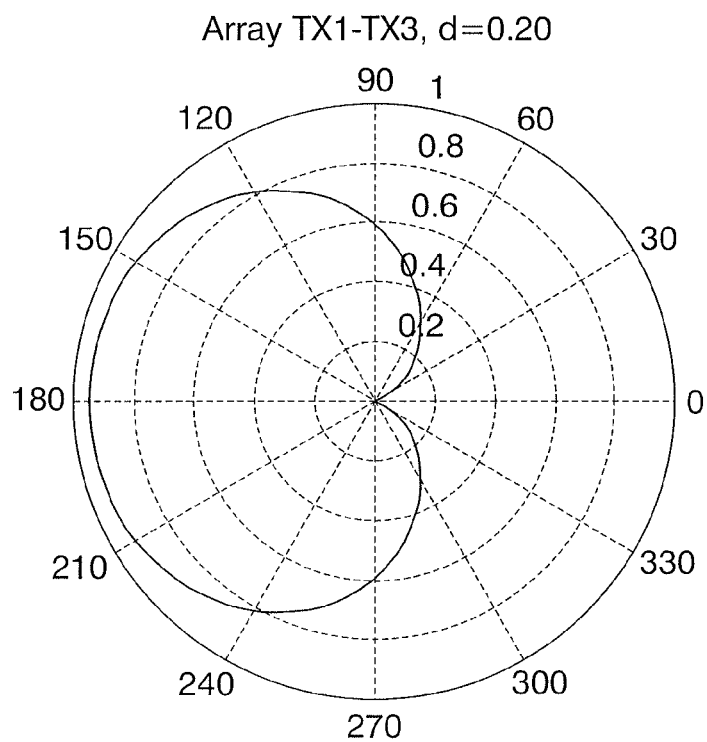
FIGS. 18, 19 and 20 show the resulting radiation pattern of each transmission layer for the case of d<λ/2 when choosing the appropriate values for the relative phases of two monopole antennas along with an additional central antenna in order to have nulls along directions Φ=0, ±π/2 in the azimuth plane, according to an embodiment of the present invention.
Figure 19:
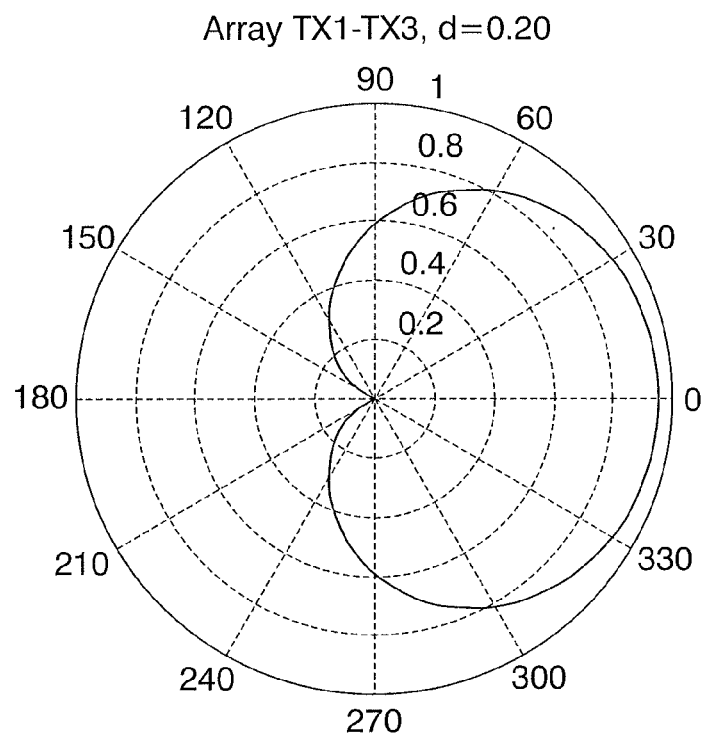
Figure 20:
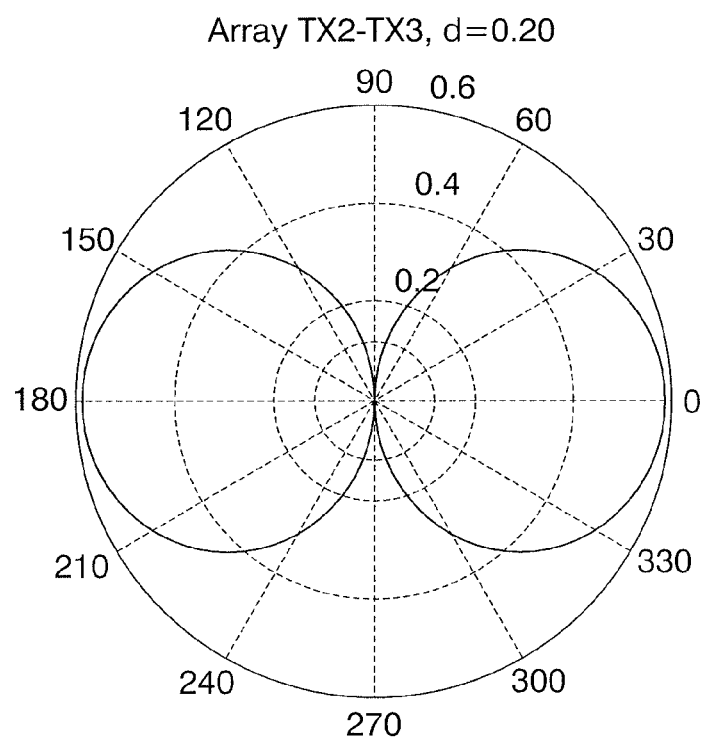

For the case of nulls along directions $\Phi=0, \pm\pi/2$ there are two possible solutions for array TX1-TX3, each of them pointing clearly towards opposite directions. Array TX2-TX3 presents two identical lobes pointing at 0 and π, as shown in FIGS. 18, 19 and 20.

It is apparent that these results are not as appealing as those of the transmitter case, due to the lower antenna separation. To overcome this, another possible geometric arrangement for the receiver antennas is explained next.

Triangular Array

Figure 21:
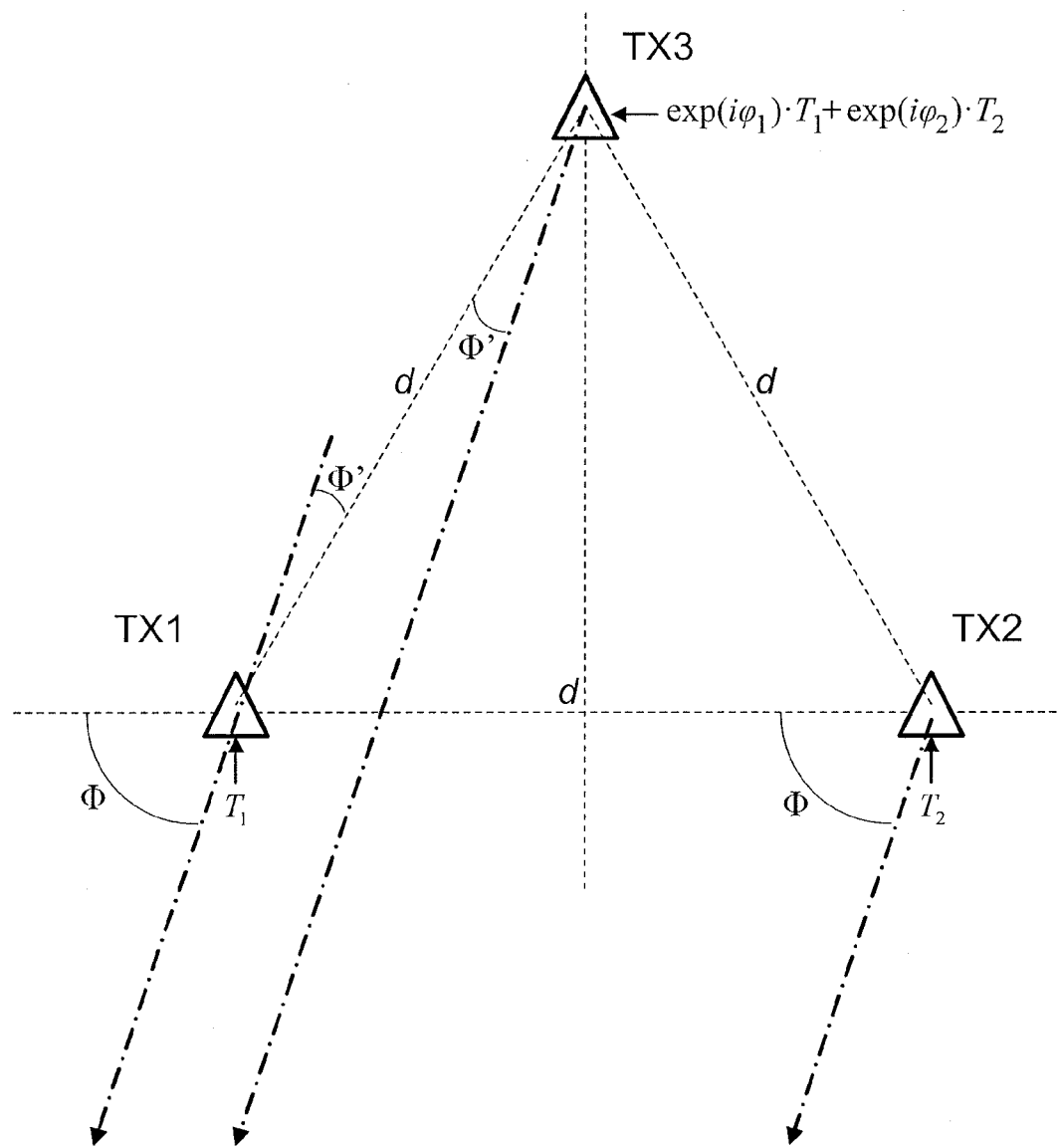
FIG. 21 shows a schematic arrangement of two monopole antennas along with an additional antenna forming an equilateral triangle seen from top perspective, according to an embodiment of the present invention.

This configuration was shown in FIG. 21, where the antennas form an equilateral triangle.

The third antenna TX3 is now located at the vertex of a triangle, with the other two antennas located at the other two vertices. This solution is more compact and naturally gives rise to different propagation directions for the two transmission layers, despite occupying a somewhat higher volume than in the linear case.

The array factors for this configuration, having in mind that $\Phi'=\Phi-\pi/3$, are:

For TX1+TX3:

$$AF_{TX1\text{-}TX3}(\Phi) = \cos\left(\frac{kd\cos(\Phi - \pi/3) - \varphi_1}{2}\right)$$

For TX2+TX3:

$$AF_{TX2\text{-}TX3}(\Phi) = \cos\left(\frac{kd\cos(\Phi + \pi/3) + \varphi_2}{2}\right)$$

Figure 22:
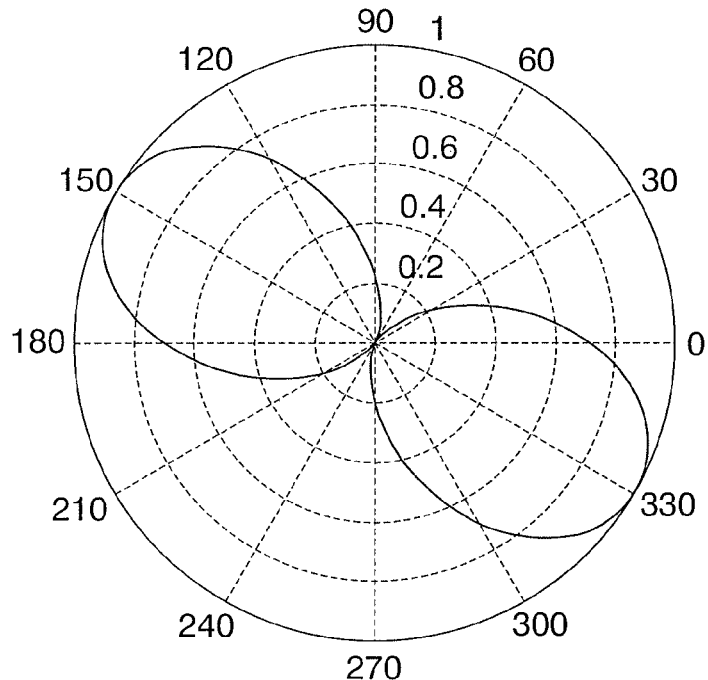
FIGS. 22 and 23 show the resulting radiation pattern of each transmission layer for the values $\phi_1=\phi_2=0$ in the case of a triangular array, according to an embodiment of the present invention.
Figure 23:
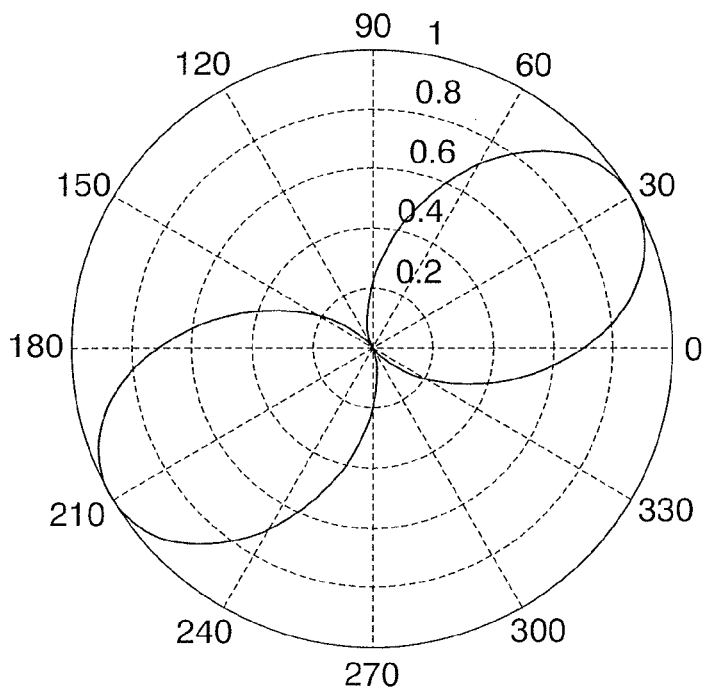

Due to the geometric arrangement the two arrays are directed towards different directions even with zero phase, i.e. $\phi_1=\phi_2=0$. FIGS. 22 and 23 showed the radiation patterns in this case.

Figure 24:
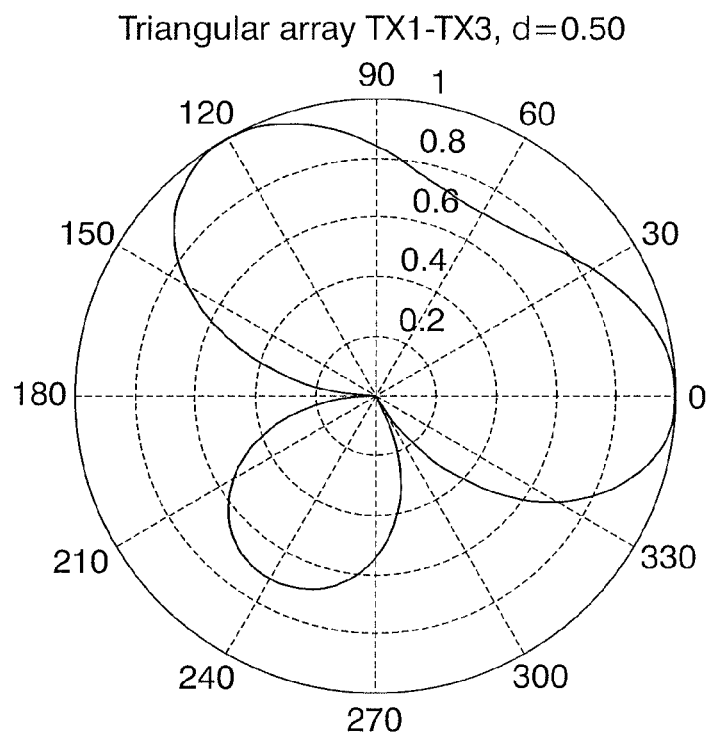
FIGS. 24 and 25 show the resulting radiation pattern of each transmission layer for the values $\phi_1=\phi_2=\pi/2$ in the case of a triangular array, according to an embodiment of the present invention.
Figure 25:
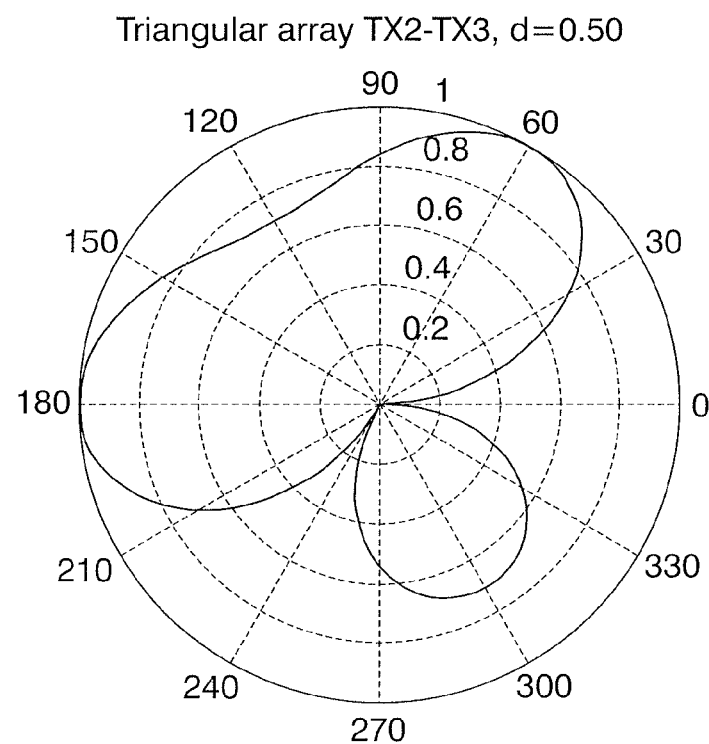
Figure 26:
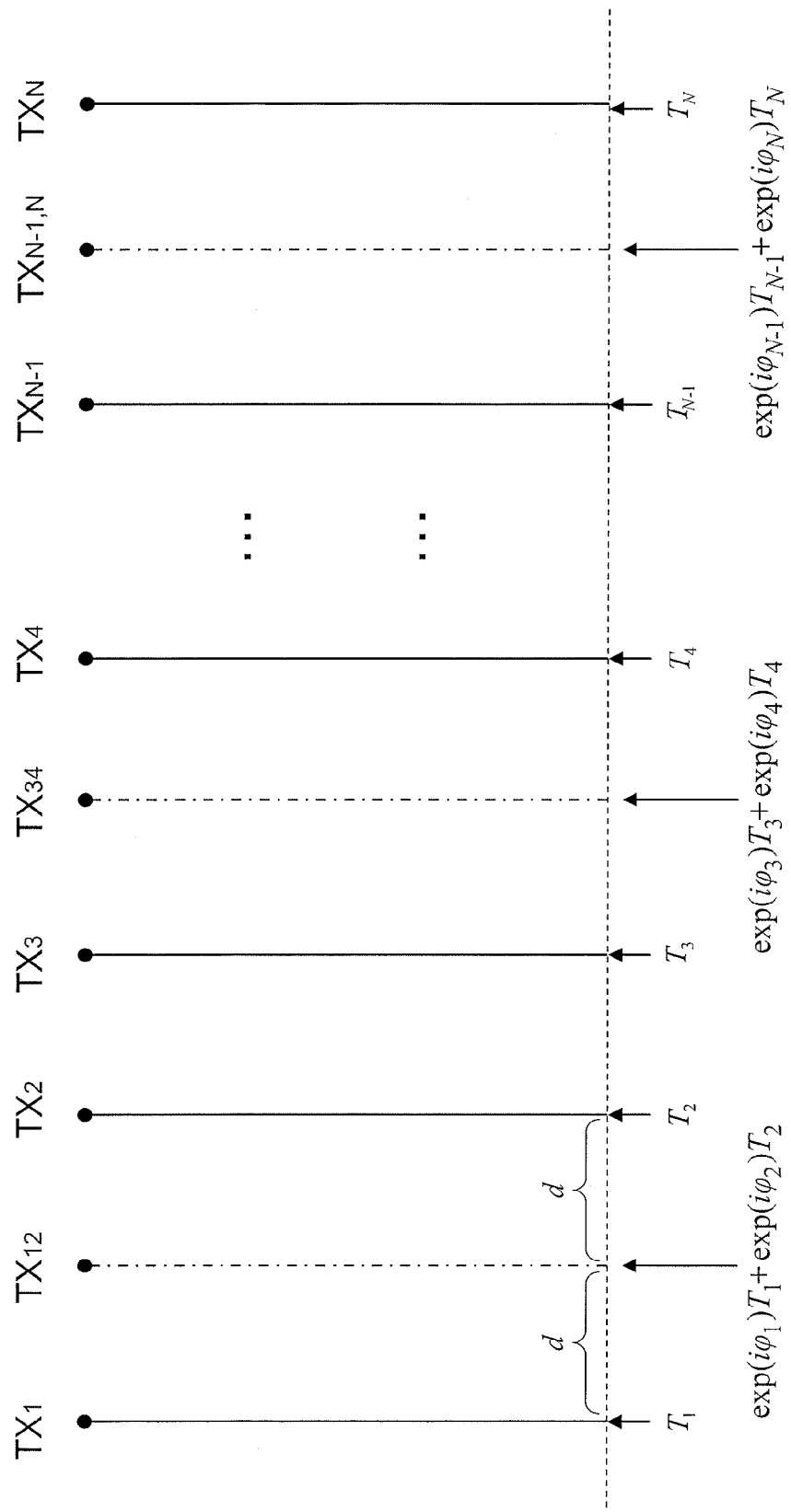
FIG. 26 shows a schematic arrangement of a transmitter with N monopole antennas and N/2 additional interleaved antenna ports, according to an embodiment of the present invention.

By setting $\phi_1=\phi_2=\pi/2$ one obtains the patterns shown in FIGS. 24 and 25.

Again there are here multiple possibilities depending on the relative phases. The chances for obtaining uncorrelated channel elements $h_{ij}$ and, thus, full-rank reception are high in this case, because of the geometric arrangement of the antennas.

Enhanced N×M SM Transmission Mode

It is straight-forward to generalize the concept described in the present invention to a MIMO system with N transmit antennas and M receive antennas. The following figure illustrates the transmitter case with N monopole antennas.

Along with the N usual transmit antennas $TX_1, TX_2, \ldots, TX_N$, there are N/2 additional interleaved antenna ports, named $TX_{12}, TX_{34}, \ldots, TX_{N-1,N}$, so as to form N/2 virtual arrays with every pair i,i+1 (if N is odd the last antenna will remain unpaired). To simplify the analysis all antennas in the figure are equally spaced a distance d, but in practice this may not be the case, according to the particular geometry considered. Antennas $TX_1, TX_2, \ldots, TX_N$ are fed with signals $T_1, T_2, \ldots, T_N$, and the new antenna elements are fed with linear combinations of them:

$$\exp(i\varphi_1)T_1 + \exp(i\varphi_2)T_2$$
$$\exp(i\varphi_3)T_3 + \exp(i\varphi_4)T_4$$
$$\ldots$$
$$\exp(i\varphi_{N-1})T_{N-1} + \exp(i\varphi_N)T_N$$

Every pair of antennas gives rise to two virtual arrays, one for each transmission layer, in a way which is similar than in 2×2. Every transmission layer will thus have a different radiation pattern, so as to enhance the correlation properties of channel matrix H.

In reception the scheme is analogous, and the received signals coming from the antennas must be combined before entering the normal demodulation process, so as to apply the desired beamforming.

Figure 27:
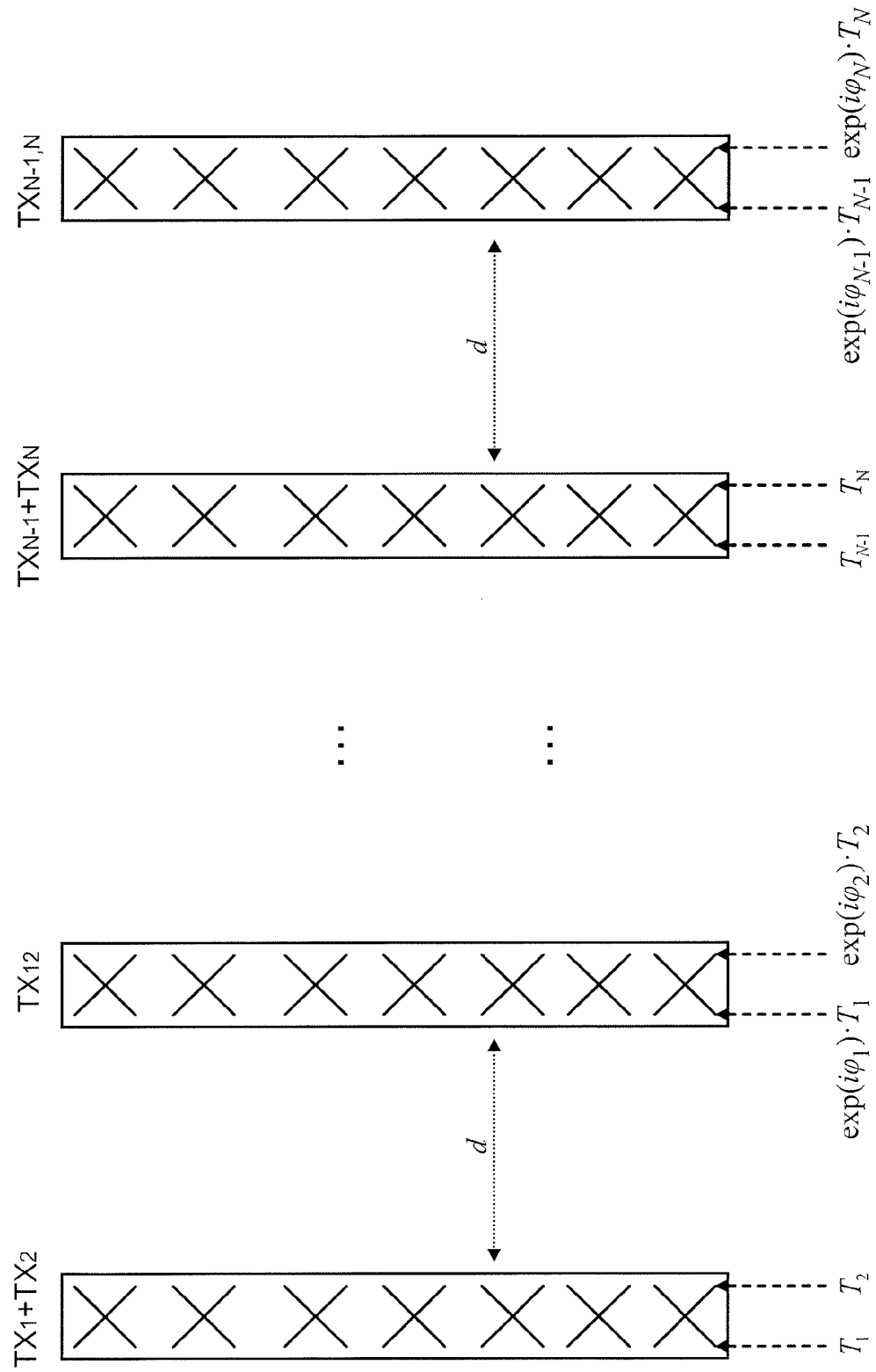
FIG. 27 shows the generic case for cross-polarized antennas, according to an embodiment of the present invention.

In case sector antennas are considered, the diagram is as the one depicted in FIG. 27.

With this arrangement the arrays are separately fed for each component, e.g. $\exp(i\phi_1)\cdot T1$ and $\exp(i\phi_2)\cdot T2$. However the analysis is identical in this case.

Figure 28:
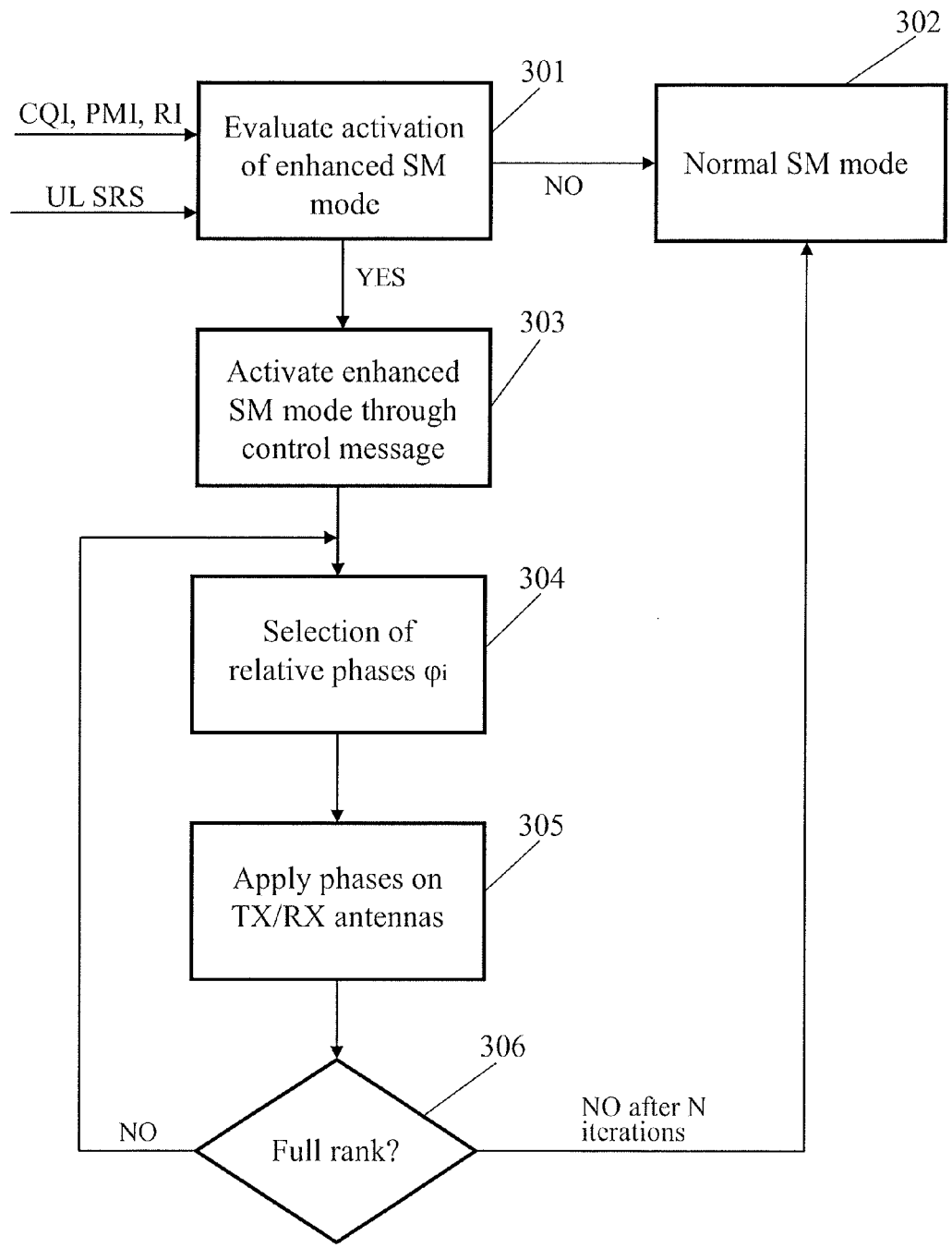
FIG. 28 shows a possible block diagram of the enhanced MIMO transmission mode proposed in the present invention.

FIG. 28 showed a preferred embodiment of the proposed invention:

The system evaluates the need to switch to the proposed enhanced SM transmission mode (block 301), based on the reports from the UEs (CQI, PMI and RI) and on the uplink sounding signals (SRS). If the conditions are not suitable for the proposed enhanced transmission mode (e.g. if the channel SNR is not high enough, or the channel rank is a maximum) the system operates normally in any of the usual open-loop or closed-loop transmission modes (block 302). On the contrary, if the channel SNR is above a predefined threshold and the channel is not operating at full-rank, the system activates the enhanced SM transmission mode by means of an appropriate control message (block 303). This in turn activates additional antenna ports as explained above.

The selection of the relative phases to feed the additional antennas is done in block 304. The actual chosen values are completely implementation-dependent and may be based upon a set of predefined patterns (e.g. forcing nulls or peaks along certain directions in space), as discussed above.

The choice of the relative phases follows an iterative procedure in which the system applies the different phases (block 305) and evaluates if the channel is full-rank (block 306). If the channel is still degenerate, the system may change the phases in order to search for the optimal values. Eventually, if after a number of iterations the channel characteristics are not improved, the system may fall back to a normal SM mode as in block 302.

It is important to emphasize that the new enhanced mode does not interfere with legacy UEs, i.e. those UEs not implementing the proposed invention. If a legacy UE receives a control message indicating the use of an enhanced transmission mode, it shall discard it and consider identical as the corresponding normal transmission mode; however the eNodeB may still apply the proposed invention in order to improve the channel properties at the TX side. Therefore the control message shall not interfere with legacy UEs, and shall be discarded by them thus operating in a normal SM mode. The control message is not described in the present invention.

ADVANTAGES OF THE INVENTION

The proposed invention tackles the problem of the degeneracy of the channel matrix in MIMO systems, which imposes a severe limitation on the exploitation of multi-antenna techniques as described for LTE-Advanced. Other usual solutions, such as adaptive arrays, are expensive and difficult to implement. Techniques described by 3GPP to enhance the correlation characteristics of the channel (such as precoding or CDD) are not effective when the transmission is not full-rank.

The advantage over other solutions is that the proposed LTE-A spatial multiplexing scheme may enhance the channel characteristics both at the eNodeB and the UE, thus tackling with the problem of end-to-end correlation. This enhanced SM MIMO mode shall be signalled from the eNodeB, and those UEs with the enhanced SM capability will be able to apply the proposed scheme, while legacy UEs will not be affected by it.

Other solutions are more complicated and expensive, yet not dealing with the correlation problem at both sides (TX and RX). In [8] the described invention is only valid for vehicular conditions, while the proposed invention is equally suitable for any environment. The solution in [9] is much more complicated to manage and build, making it unsuitable for low-cost UEs, while the present invention is particularly simple and cost-effective. In [10] the described multibeam antenna has the drawback of pointing towards fixed directions of space, hence making it non-adaptive, while the proposed invention allows for an adaptive and proprietary search for the optimal configuration. In [11] a correlation matrix must be obtained, thus complicating the operation of the system, and the number of required antennas is also higher than in the present invention.

The proposed enhanced transmission mode is a simple and cost-effective way of improving the channel properties, by enforcing different channel coefficients for the transmission layers in order to enhance the correlation characteristics. As no additional power amplifiers or LNAs are needed for the extra antenna elements, there is a minimal complexity increase in the eNodeBs and UEs.

The operation of the enhanced transmission mode in channel conditions which would otherwise be unsuitable for spatial multiplexing (such as LOS) results in an increased user throughput, leading to a higher cell throughput and increased revenues. Moreover, the quality of experience is also enhanced, as the users may receive multiple spatial streams for the same radio conditions.

A person skilled in the art could introduce changes and modifications in the embodiments described without departing from the scope of the invention as it is defined in the attached claims.

ACRONYMS

3GPP Third Generation Partnership Project
AF Array Factor
CDD Cyclic Delay Diversity
CQI Channel Quality Indicator
GSM Global System for Mobile Communications
IMT International Mobile Telecommunications
LNA Low Noise Amplifier
LOS Line of Sight
LTE Long-Term Evolution
LTE-A Long-Term Evolution Advanced
MIMO Multiple Input-Multiple Output
OL-MIMO Open-Loop MIMO
CL-MIMO Closed-Loop MIMO
PMI Precoding Matrix Indicator
PUCCH Physical Uplink Control Channel
PUSCH Physical Uplink Shared Channel
RI Rank Indicator
RX Receiver
SM Spatial Multiplexing
SNR Signal to Noise Ratio
SRS Sounding Reference Signal
SU-MIMO Single-User Multiple Input-Multiple Output
TM Transmission Mode
TX Transmitter
UE User Equipment
UMTS Universal Mobile Telecommunication System

REFERENCES

[1] Patent Definition. http://en.wikipedia.org/wiki/Patent.
[2] 3GPP TS 36.300, Evolved Universal Terrestrial Radio Access (E-UTRA) and Evolved Universal Terrestrial Radio Access Network (E-UTRAN); Overall Description, Stage 2 (Release 8)
[3] http://www.3gpp.org/LTE-Advanced
[4] S. Sesia, I. Toufik, M. Baker (editors), "LTE, the UMTS Long Term Evolution: From Theory to Practice", John Wiley & Sons, 2009

[5] 3GPP TS 36.211, Evolved Universal Terrestrial Radio Access (E-UTRA); Physical channels and modulation (Release 10)
[6] http://en.wikipedia.org/wiki/Rank_(linear_algebra)
[7] C. A. Balanis, "Antenna Theory: Analysis and Design", 2nd edition, John Wiley and sons
[8] Patent Application WO2011/011307 A1, "System and Method for Improving MIMO Performance of Vehicular Based Wireless Communications"
[9] USPTO Patent Application US2009/0209212 A1, "Method and Apparatus for an Adaptive Multiple-input Multiple-output (MIMO) Wireless Communications Systems"
[10] USPTO Patent Application US2010/007573 A1, "Multibeam Antenna"
[11] USPTO Patent Application US2008/0225972 A1, "Method and System for Partitioning an Antenna Array and Applying Multiple-input Multiple-output and Beamforming Mechanisms"

The invention claimed is:

1. A method to implement a Multiple Input Multiple Output transmission mode, said MIMO transmission mode comprising using a plurality of first antennas in a user equipment and a plurality of second antennas in a radio access node for the communication between said user equipment and said radio access node, said communication carried out by means of a communication channel, said communication channel represented by a channel matrix, comprising uncorrelating at least part of the coefficients of said channel matrix when said communication channel is degenerate by making use of at least one additional antenna in each of said radio access node and said user equipment in order to change radiation patterns associated to transmission layers of said communication, the method comprising:
creating two arrays between said at least one additional antenna and two adjacent antennas of said plurality of second antennas or said plurality of first antennas, each of said two arrays associated to one of said transmission layers; and
feeding said at least one additional antenna with a linear combination of the signals that feed said two adjacent antennas, according to the following expression:

$$T_3 = \exp(i\cdot\phi_1)\cdot T_1 + \exp(i\cdot\phi_2)\cdot T_2$$

where
$T_3$ is the signal that feeds said at least one additional antenna;
$T_1$ and $T_2$ are said signals that feed said two adjacent antennas;
$\phi_1$ and $\phi_2$ are the relative phases of said adjacent antennas;
exp is the exponential function; and
i is equal to a square root of $-1$.

2. A method as per claim 1, wherein said at least one additional antenna forms a triangular array with two adjacent antennas of said plurality of second antennas or said plurality of first antennas.

3. A method as per claim 1, wherein said at least one additional antenna is a panel antenna with pairs of cross-polarized elements when said antennas of said plurality of second antennas are linearly cross-polarized antennas, having one panel antenna for every pair of said linearly cross-polarized antennas.

4. A method as per claim 1, wherein the distance between said at least one additional antenna and each of said two adjacent antennas is at least of half a wavelength.

5. A method as per claim 3, comprising feeding each of said cross-polarized elements of said panel antenna according to the following expressions:

$$T_{3x} = \exp(i\cdot\phi_1)\cdot T_1$$

$$T_{3y} = \exp(i\cdot\phi_2)\cdot T_2$$

where
$T_{3x}$ and $T_{3y}$ are the signals that feed each of said cross-polarized elements of said panel antenna;
$T_1$ and $T_2$ are the signals that feed each of said linearly cross-polarized antennas in a pair of linearly cross-polarized antennas;
$\phi_1$ and $\phi_2$ are the relative phases of said linearly cross-polarized antennas in said pair of linearly cross-polarized antennas; and
exp is the exponential function.

6. A method as per claim 1, comprising having half the number of additional antennas with respect to said plurality of second antennas or said plurality of first antennas, said additional antennas being interleaved between said plurality of second antennas or said plurality of first antennas, each of said additional antennas forming two arrays with its two adjacent antennas, leaving one antenna of said plurality of second antennas or said plurality of first antennas unpaired if there is an odd quantity of said plurality of second antennas or said plurality of first antennas.

7. A method as per claim 1, wherein said communication is performed in a Long Term Evolution-Advanced mobile network.

8. A method as per claim 1, comprising making use of said enhanced MIMO transmission mode if the rank of said channel matrix associated to said communication channel is lower than the minimum of said plurality of first antennas and said plurality of second antennas or if at least part of said coefficients of said channel matrix are correlated.

9. A method as per claim 8 wherein said communication is performed in a Long Term Evolution-Advanced mobile network; and, comprising calculating, said radio access node, said rank of said channel matrix according to Channel Quality Indicators and Rank Indicators sent from said user equipment to said radio access node.

10. A method as per claim 1, comprising choosing values for said relative phases in order to force nulls and/or peaks along certain directions in space in said radiation patterns.

11. A method as per claim 1, comprising, in order to remove the degeneracy of said communication channel, varying said relative phases when transmitting signals from said radio access node.

12. A method as per claim 10 comprising performing, said radio access node, an adaptative search of the optimum values for said relative phases.

13. A method as per claim 1, comprising informing to said user equipment that said enhanced MIMO transmission mode is used to perform said communication.

* * * * *